E. P. GRISHAM.
ATTACHMENT FOR STUFFING BOXES.
APPLICATION FILED FEB. 3, 1912.

1,078,784.

Patented Nov. 18, 1913.

WITNESSES
G. M. Spring.

INVENTOR
Edward P. Grisham,
Richard ......
his Attorney

UNITED STATES PATENT OFFICE.

EDWARD P. GRISHAM, OF ST. LOUIS, MISSOURI.

ATTACHMENT FOR STUFFING-BOXES.

1,078,784.   Specification of Letters Patent.   Patented Nov. 18, 1913.

Application filed February 3, 1912. Serial No. 675,189.

*To all whom it may concern:*

Be it known that I, EDWARD P. GRISHAM, a citizen of the United States, residing at St. Louis, in the State of Missouri, have invented new and useful Improvements in Attachments for Stuffing-Boxes, of which the following is a specification.

My invention relates to attachments for stuffing boxes and more specifically to an attachment adapted to engage the packing carried by a stuffing box, which attachment will allow for the contraction and expansion of the packing.

An object of my invention is to provide an attachment of the above character which is especially applicable to ice making machines and the like, wherein the packing becomes frozen at different times.

A further object of my invention is to provide an attachment of the above mentioned character which is simple in construction and can be easily attached or removed from a stuffing box.

With the foregoing and other objects in view my invention relates to such details of construction and in the arrangement and combination of parts as will be hereinafter fully described and specifically pointed out in the appended claims.

Figure 1:
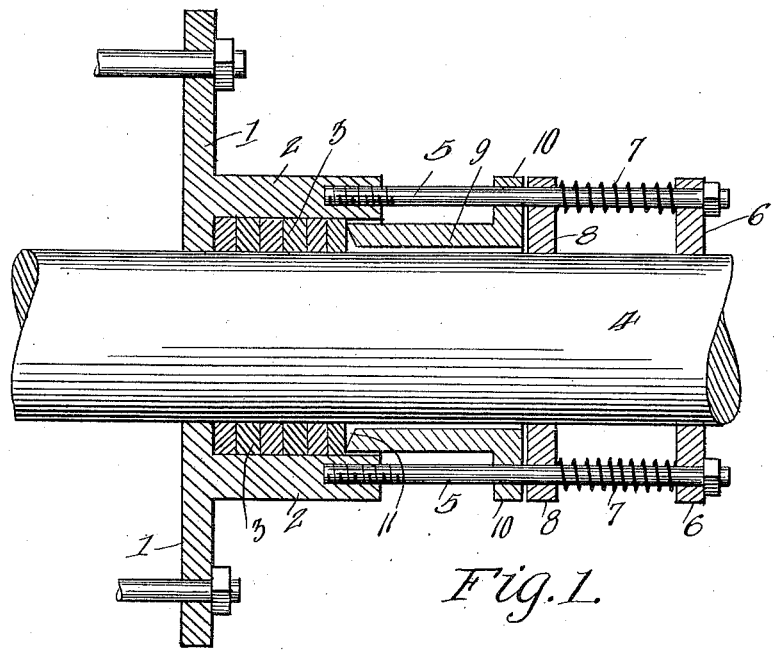
Figure 2:
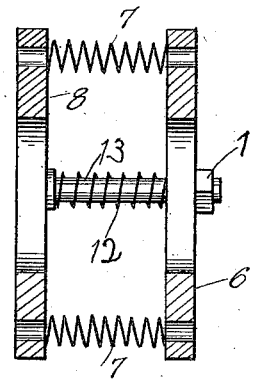

In describing my invention in detail reference will be had to the accompanying drawings wherein like characters denote like or corresponding parts throughout the several views, and in which:

Figure 1 is a vertical sectional view of my invention as in place. Fig. 2 is a cross sectional view of a detail.

In the accompanying drawings which fully illustrate the preferred form of my invention the numeral 1 designates the head of an ordinary stuffing box upon which is formed the annular collar 2, the said collar being adapted to receive a plurality of packing rings 3. A piston rod 4 operates through the head of the stuffing box 1 and through the rings 3 as shown. Connected to the collar 2 are the rods 5 which support at their outer ends a plate 6, the piston rod 4 operating through the said plate.

Mounted on rods 5 between the plate 6 and a second plate 8 are a pair of springs 7. Between the springs 7 and on opposite sides of the piston rod 4 are additional springs 12 carried by studs 13, said studs being threaded into the outer face of the plate 8 and projecting outwardly through apertures formed in the plate 6. Nuts or heads 14 are carried, preferably adjustably, upon the outer ends of the studs 13 and engage the outer face of the plate 6 upon the limit of the separating movement of the plates. The plates 6 and 8 are limited in their expanding movement to prevent forcing the packing, when it has become worn and broken up, inwardly through the stuffing box 1. The plate 8 thus serves as a guard plate admitting of the automatic adjustment of the packing and at the same time preventing the forcing of the worn packing out of the box.

For the purpose of yieldingly engaging the packing rings 3 a sleeve 9 is provided which sleeve is provided with an annular flange 10 which is slidably mounted upon the rods 5 as shown. The inner ends of the sleeve 9 are formed as shown at 11 whereby they may more readily engage the packing rings 3 and force the same into engagement with the rod 4. It will be readily seen that when the rings become frozen they contract and as they do so the sleeve will be pushed farther into the collar 2 through the medium of the coiled springs 7. If, on the other hand, the rings become very hot they expand, thereby forcing the sleeve outwardly and contracting the springs 7.

I desire to lay the greatest of stress upon the simplicity of my device and that it can be easily attached to the different stuffing boxes now in use.

It is to be understood that I may make slight changes in the construction of my invention without departing from the spirit thereof, provided, however, said changes fall within the scope of the subjoined claims.

Having thus fully described my invention what I claim as new and desire to secure by Letters Patent is:—

1. In packing and in combination, a stuffing box packing in said box, a gland projecting in said box and against said packing, adjustable means yieldingly pressing said gland against said packing, and adjustable guarding means associated with said first means for limiting the pressing movement of said first means.

2. In packing and in combination, a stuffing box adapted to receive packing, a gland in said box, yielding means bearing against said gland whereby to compress said packing, and limiting means connected to said yielding means whereby to limit the compression of said packing.

3. An attachment for stuffing boxes comprising guide rods for securement to a stuffing box, a plate adjustably mounted upon the outer ends of said rods, springs surrounding said rods and bearing at one end against said plate and at their opposite ends against the gland of said stuffing box, a guard plate slidably mounted on said rods between said gland and said springs, studs projecting from said guard plate and engaging slidably through said first plate, and heads adjustably mounted upon the outer ends of said studs and adapted for engagement against the outer face of said plate to limit the expansion of said springs.

4. An attachment for stuffing boxes comprising a pair of rods adapted for securement to a stuffing box, a pair of plates slidably mounted on said rods between said plates for yieldably holding the same apart, adjustable nuts carried on the outer ends of the rods and adapted to bear against the outer one of said plates whereby to yieldably hold the inner plate against the gland of said stuffing box, and means carried by said plates for limiting the separating movement of the same.

EDWARD P. GRISHAM.

Witnesses:
FRANK CLARK,
EDWARD H. CUNNINGHAM.

---

Copies of this patent may be obtained for five cents each, by addressing the "Commissioner of Patents, Washington, D. C."